United States Patent
Xu

(10) Patent No.: US 8,743,329 B2
(45) Date of Patent: Jun. 3, 2014

(54) LIQUID CRYSTAL DISPLAY PANEL AND APPARATUS HAVING THE LIQUID CRYSTAL DISPLAY PANEL

(75) Inventor: Liang Xu, Guangdong (CN)

(73) Assignee: Shenzhen China Star Optoelectronics Technology Co., Ltd., Guangdong (CN)

(*) Notice: Subject to any disclaimer, the term of this patent is extended or adjusted under 35 U.S.C. 154(b) by 23 days.

(21) Appl. No.: 13/700,391

(22) PCT Filed: Aug. 7, 2012

(86) PCT No.: PCT/CN2012/079753
§ 371 (c)(1),
(2), (4) Date: Nov. 27, 2012

(87) PCT Pub. No.: WO2014/008699
PCT Pub. Date: Jan. 16, 2014

(65) Prior Publication Data
US 2014/0009719 A1  Jan. 9, 2014

(30) Foreign Application Priority Data
Jul. 9, 2012 (CN) .......................... 2012 1 0235563

(51) Int. Cl.
*G02F 1/1343* (2006.01)

(52) U.S. Cl.
USPC ............................................ 349/141; 349/143

(58) Field of Classification Search
None
See application file for complete search history.

(56) References Cited

U.S. PATENT DOCUMENTS

2009/0310047 A1* 12/2009 Shin et al. .................. 349/37
2011/0149223 A1* 6/2011 Tsao et al. .................. 349/141

* cited by examiner

Primary Examiner — Lucy Chien
(74) Attorney, Agent, or Firm — Kirton McConkie; Evan R. Witt

(57) ABSTRACT

The present invention provides a liquid crystal display panel and a display apparatus having the liquid crystal display panel. A second substrate of the liquid crystal display panel includes a second electrode and a plurality of pixel areas. The second electrode has a pixel electrode structure in each of the pixel areas. The pixel electrode structure includes a trunk and a plurality of branches. A distance between the two neighboring branches is an interval. Each of the branches has a width. Each of the pixel areas has at least two widths and at least two intervals.

20 Claims, 4 Drawing Sheets

R  G  B

LIQUID CRYSTAL DISPLAY PANEL AND APPARATUS HAVING THE LIQUID CRYSTAL DISPLAY PANEL

BACKGROUND OF THE INVENTION

1. Field of the Invention

The present invention relates to a liquid crystal display (LCD) technology, more particularly, to a liquid crystal display panel an apparatus having the liquid crystal panel.

2. Description of the Related Art

Liquid crystal displays have been extensively applied in various electronic products. Most of the liquid crystal displays are backlight liquid crystal displays, which are made up of a liquid crystal display panel and a backlight module, and the liquid crystal panel is made up of two transparent substrates and liquid crystal molecules sealed in a space between the two substrates.

Nowadays, a vertical alignment (VA) technology has been developed and applied to liquid crystal panels. For example, polymer-stabilized vertical alignment liquid (PSVA) liquid crystal displays, formed by a polymer-stabilized alignment (PSA) process, have the advantages of a wide viewing angle, a high aperture rate, a high contrast ratio, and simple processing.

In PSVA liquid crystal displays, reactive monomers are mixed with liquid crystal molecules disposed between the two transparent substrates. A surface of each of the transparent substrates is coated with a polyimide (PI) film which is used as an alignment substrate. When a voltage is applied to and ultraviolet (UV) lights are provided to illuminate the two transparent substrates, phase separation of the reactive monomers in liquid crystal mixture are induced. Polymers are thus formed on the alignment substrates of the transparent substrates. Owing to the interactions between the polymers and liquid crystal molecules, liquid crystal molecules tend to align along the orientation direction of the polymers. Hence, a pre-tilt angle of the liquid crystal molecules disposed between the two transparent substrates is formed.

Under the circumstances, the pre-tilt angle of individual liquid crystal molecule is highly consistent with that of other liquid crystal molecules. When a voltage is applied to the PSVA liquid crystal display, the liquid crystal molecules will twist toward a consistent direction, which results in the phenomenon of severe color shift at large viewing angle.

SUMMARY OF THE INVENTION

The present invention provides a liquid crystal display panel and a display apparatus having the liquid crystal display panel so as to resolve the severe color shift problem at large viewing angle in the VA liquid crystal display panels.

According to the present invention, a liquid crystal display panel comprises:

a first substrate comprising a first electrode;

a second substrate comprising a second electrode and a plurality of pixel areas, the second electrode having a pixel electrode structure in each of the pixel areas, the pixel electrode structure comprising a trunk and a plurality of branches, the trunk comprising a first trunk and a second trunk, the first trunk and the second trunk being perpendicular to each other and dividing the pixel area into four sub-pixel areas, the branch being in strip form, a distance between the two neighboring branches being an interval, each of the branch having a width, each of the pixel areas having at least two widths and at least two intervals, the branches having different widths and different intervals being electrically connected; and a liquid crystal layer formed between the first substrate and the second substrate.

In one aspect of the present invention, the plurality of branches in each of the sub-pixel areas comprise a plurality of first branches and a plurality of second branches, each of the first branches has a first width, each of the second branches has a second width, a distance between the two neighboring first branches is a first interval, and a distance between the two neighboring second branches is a second interval;

wherein the four sub-pixel areas are symmetry around the first trunk and the second trunk.

In another aspect of the present invention, the sub-pixel area comprises a plurality of third branches, the third branch has a third width, and a distance between the two neighboring third branches is a third interval.

In another aspect of the present invention, the first branches, the second branches, and the third branches are in the same sub-pixel area, and the four sub-pixel areas in each of the pixel areas are symmetry around the first trunk and the second trunk.

In another aspect of the present invention, the first branch and the second branch are in one of the sub-pixel areas, the second branch and the third branch are in the other sub-pixel area, the two sub-pixel areas are symmetry around the first trunk;

wherein the four sub-pixel areas are symmetry around the second trunk.

In another aspect of the present invention, the first branch and the second branch are electrically connected to each other.

In another aspect of the present invention, the first branch, the second branch and the third branch are electrically connected to each other.

According to the present invention, a liquid crystal display panel comprises:

a first substrate comprising a first electrode;

a second substrate comprising a second electrode and a plurality of pixel areas, the second electrode having a pixel electrode structure in each of the pixel areas, the pixel electrode structure comprising a trunk and a plurality of branches, the branch being in strip form, a distance between the two neighboring branches being an interval, each of the branch having a width, each of the pixel areas having at least two widths and at least two intervals; and a liquid crystal layer formed between the first substrate and the second substrate.

In one aspect of the present invention, the trunk comprises a first trunk and a second trunk, the first trunk and the second trunk is perpendicular to each other and divide the pixel area into four sub-pixel areas;

wherein the plurality of branches in each of the sub-pixel areas comprise a plurality of first branches and a plurality of second branches, each of the first branches has a first width, each of the second branches has a second width, a distance between the two neighboring first branches is a first interval, and a distance between the two neighboring second branches is a second interval;

wherein the four sub-pixel areas are symmetry around the first trunk and the second trunk.

In another aspect of the present invention, the sub-pixel area comprises a plurality of third branches, the third branch has a third width, and a distance between the two neighboring third branches is a third interval.

In another aspect of the present invention, the first branches, the second branches, and the third branches are in the same sub-pixel area, and the four sub-pixel areas in each of the pixel areas are symmetry around the first trunk and the second trunk.

In another aspect of the present invention, the first branch and the second branch are in one of the sub-pixel areas, the second branch and the third branch are in the other sub-pixel area, the two sub-pixel areas are symmetry around the first trunk;

wherein the four sub-pixel areas are symmetry around the second trunk.

In another aspect of the present invention, the first branch and the second branch are electrically connected to each other.

In another aspect of the present invention, the first branch, the second branch and the third branch are electrically connected to each other.

According to the present invention, a display apparatus comprises a backlight module and a liquid crystal display panel. The liquid crystal display panel comprises:

a first substrate comprising a first electrode;

a second substrate comprising a second electrode and a plurality of pixel areas, the second electrode having a pixel electrode structure in each of the pixel areas, the pixel electrode structure comprising a trunk and a plurality of branches, the branch being in strip form, a distance between the two neighboring branches being an interval, each of the branch having a width, each of the pixel areas having at least two widths and at least two intervals; and a liquid crystal layer formed between the first substrate and the second substrate.

In one aspect of the present invention, the trunk comprises a first trunk and a second trunk, the first trunk and the second trunk is perpendicular to each other and divide the pixel area into four sub-pixel areas;

wherein the plurality of branches in each of the sub-pixel areas comprise a plurality of first branches and a plurality of second branches, each of the first branches has a first width, each of the second branches has a second width, a distance between the two neighboring first branches is a first interval, and a distance between the two neighboring second branches is a second interval;

wherein the four sub-pixel areas are symmetry around the first trunk and the second trunk.

In another aspect of the present invention, the sub-pixel area comprises a plurality of third branches, the third branch has a third width, and a distance between the two neighboring third branches is a third interval.

In another aspect of the present invention, the first branches, the second branches, and the third branches are in the same sub-pixel area, and the four sub-pixel areas in each of the pixel areas are symmetry around the first trunk and the second trunk.

In another aspect of the present invention, the first branch and the second branch are in one of the sub-pixel areas, the second branch and the third branch are in the other sub-pixel area, the two sub-pixel areas are symmetry around the first trunk;

wherein the four sub-pixel areas are symmetry around the second trunk.

In another aspect of the present invention, the first branch and the second branch are electrically connected to each other.

In contrast to the prior art, the strip branches in each of the sub-pixel areas have at least two widths and at least two intervals according to the present invention, different pre-tilt angles will be provided to the liquid crystal molecules when alignment process is performed. The different pre-tilt angles will in turn solve the color shift problem at large viewing angle in display mode. In addition, the different electric field strengths caused by the strip branches having different widths and intervals in display mode will also improve the color shift problem at large viewing angle.

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE PREFERRED EMBODIMENTS

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 1:
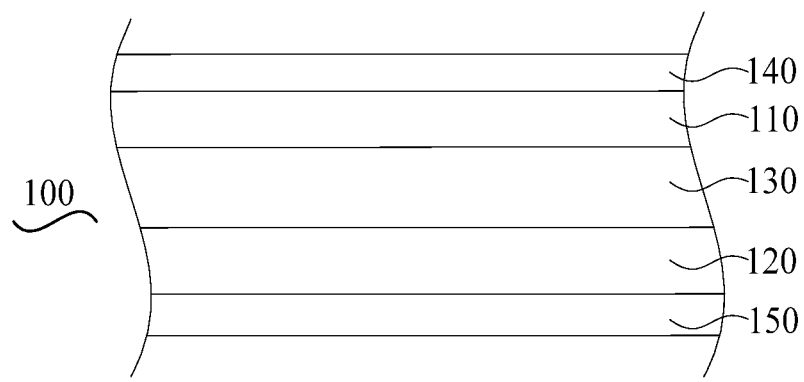
FIG. 1 is a detailed cross-sectional diagram of a present invention liquid crystal display panel according to an embodiment of the present invention.

Please refer to FIG. 1, FIG. 1 is a detailed cross-sectional diagram of a present invention liquid crystal display panel according to an embodiment of the present invention. A display apparatus according to the embodiment comprises a liquid crystal display panel 100 and a backlight module (not shown). The liquid crystal display panel 100 is disposed over the backlight module. The backlight module comprises a side lighting backlight module or a bottom lighting backlight module to provide backlight to the liquid crystal display panel 100. The liquid crystal display panel 100 comprises a VA liquid crystal display panel, a PSVA liquid crystal display panel, a pattern vertical alignment (PVA) liquid crystal display panel, or a multi-domain vertical alignment (MVA) liquid crystal display panel.

As shown in FIG. 1, the liquid crystal display panel 100 comprises a first substrate 110, a second substrate 120, a liquid crystal layer 130, a first polarizer 140, and a second polarizer 150.

The liquid crystal layer 130 is formed between the first substrate 110 and the second substrate 120. That means, the liquid crystal layer 130 is at an inner side of the first substrate 110 and the second substrate 120. The first polarizer 140 is disposed on an outer side of the first substrate 110, and the second polarizer 150 is disposed on an outer side of the second substrate 120.

As shown in FIG. 1, the first substrate 110 and the second substrate 120 may be a glass substrate or a flexible plastic substrate. The first substrate 110, for example, may be a glass substrate or a substrate made of other materials having a color filter (CF) on it. The second substrate 120, for example, may be a glass substrate or a substrate made of other materials having a thin film transistor (TFT) matrix on it. It is worth noting that the color filter and the TFT matrix may be disposed on the same substrate in some embodiments.

Figure 2:
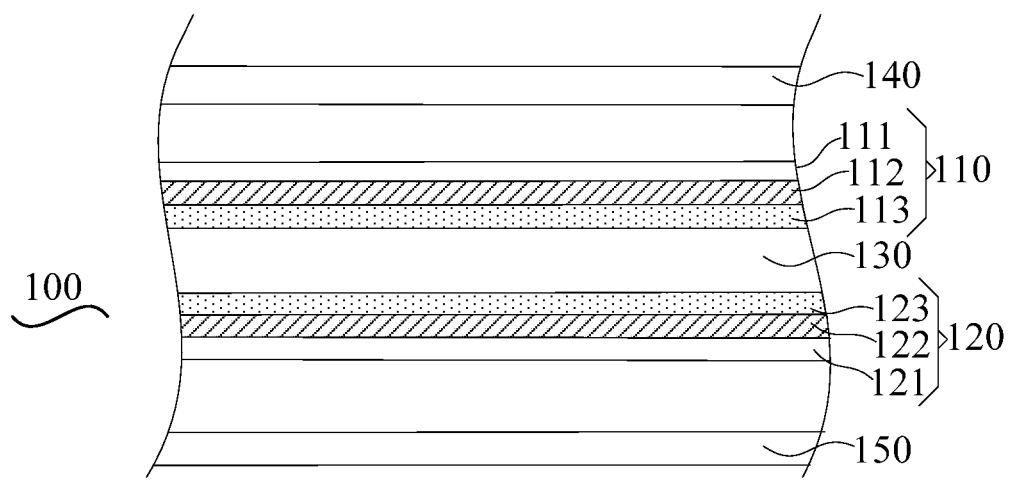
FIG. 2 is a detailed cross-sectional diagram of the PSVA liquid crystal display panel according to the embodiment of the present invention.

In the present embodiment, the liquid crystal display panel 100 in FIG. 1 is for example a PSVA liquid crystal display panel. Please refer to FIG. 2, FIG. 2 is a detailed cross-sectional diagram of the PSVA liquid crystal display panel according to the embodiment of the present invention. The liquid crystal layer 130 comprises reactive monomers and liquid crystal molecules. The preferred reactive monomer is a light sensitive monomer, and the reactive monomers are mixed with the liquid crystal molecules. The first polarizer 140 is disposed on a side of the first substrate 110 and opposite to the liquid crystal layer 130 (namely a light emission side of the first substrate 110). The second polarizer 150 is disposed on a side of the second substrate 120 and opposite to the liquid crystal layer 130 (namely a light entrance side of the second substrate 120).

As shown in FIG. 2, the liquid crystal panel 100 is a PSVA liquid crystal display panel according to the embodiment of the present invention. The first substrate 110 may comprise a first electrode 111, a first alignment layer 112, a first polymer alignment layer 113, and a first substrate (not shown). The first alignment layer 112 and the first polymer alignment layer 113 are sequentially formed on the first electrode 111. The second substrate 120 may comprise a second electrode 121, a second alignment layer 122, a second polymer alignment layer 123, and a second substrate (not shown). The second alignment layer 122 and the second polymer alignment layer 123 are sequentially formed on the second electrode 121. The first electrode 111 and the second electrode 121 are preferably made of a transparent conductive material. The transparent conductive material may be, for example, ITO, IZO, AZO, GZO, TCO, or ZnO. When a voltage is applied across the first electrode 111 and the second electrode 112, a potential is applied to the liquid crystal molecules in the liquid crystal layer 130. In the preferred embodiment, the first electrode 111 is for example a common electrode, the second electrode 121 is for example a pixel electrode. The second electrode 121 may have multiple areas (not shown). The voltage applied to each area may be the same as or different from that applied to another area. The first alignment layer 112, the second alignment layer 122, the first polymer alignment layer 113, and the second polymer alignment layer 123 may have the same alignment direction so as to determine how the liquid crystal molecules of the liquid crystal layer 130 are aligned. The first alignment layer 112, the second alignment layer 122, the first polymer alignment layer 113, and the second polymer alignment layer 123 may have a pre-tile angle smaller than 90°, and preferably smaller than 60°. The first alignment layer 112 and the second alignment layer 122 are formed on the first substrate 110 and the second substrate 120, respectively. The first polymer alignment layer 113 and the second polymer alignment layer 123, formed by polymerization of the reactive monomers, are formed on the first alignment layer 112 and the second alignment layer 122, respectively.

Figure 3:
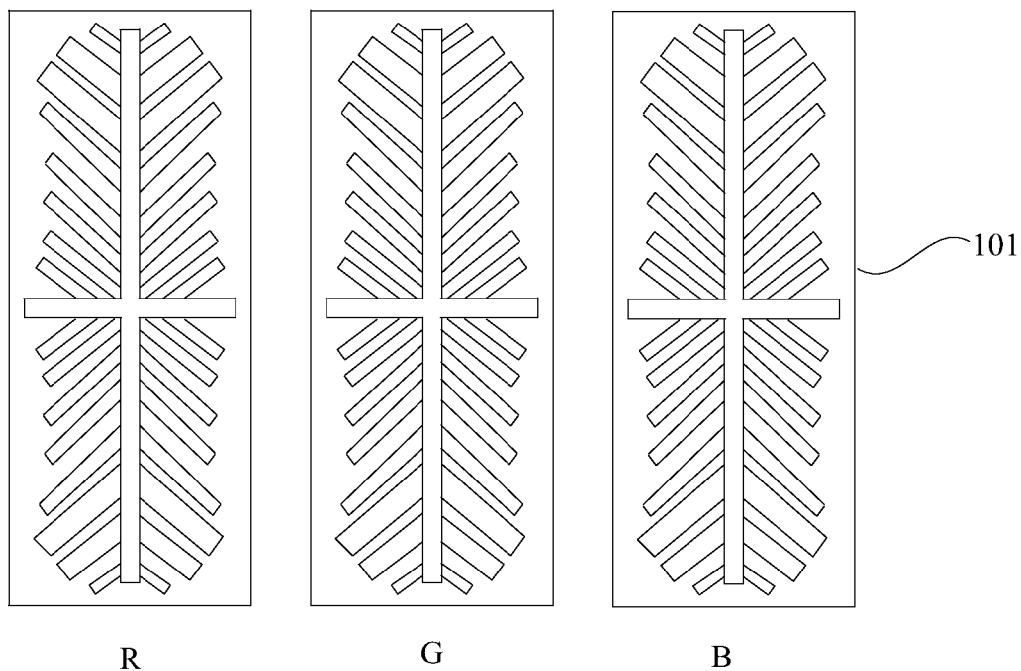
FIG. 3 is a schematic diagram showing a structure of a pixel electrode in the present invention liquid crystal display panel according to a first preferred embodiment of the present invention.

Please also refer to FIG. 3, FIG. 3 is a schematic diagram showing a structure of a pixel electrode in the present invention liquid crystal display panel according to a first preferred embodiment of the present invention. The second substrate 120 comprises a plurality of signal lines (not shown). The signal lines are for example gate lines and data lines. The gate lines crossing perpendicular to the data lines, are arranged in a matrix. Hence, a plurality of pixel areas 101 are defined. In this figure, an R pixel area, a G pixel area, and a B pixel area respectively corresponding to red light, green light, and blue light are shown in order. In each of the pixel areas 101, the second electrode 121 has a pixel electrode structure for producing multi-domain alignment.

Figure 4:
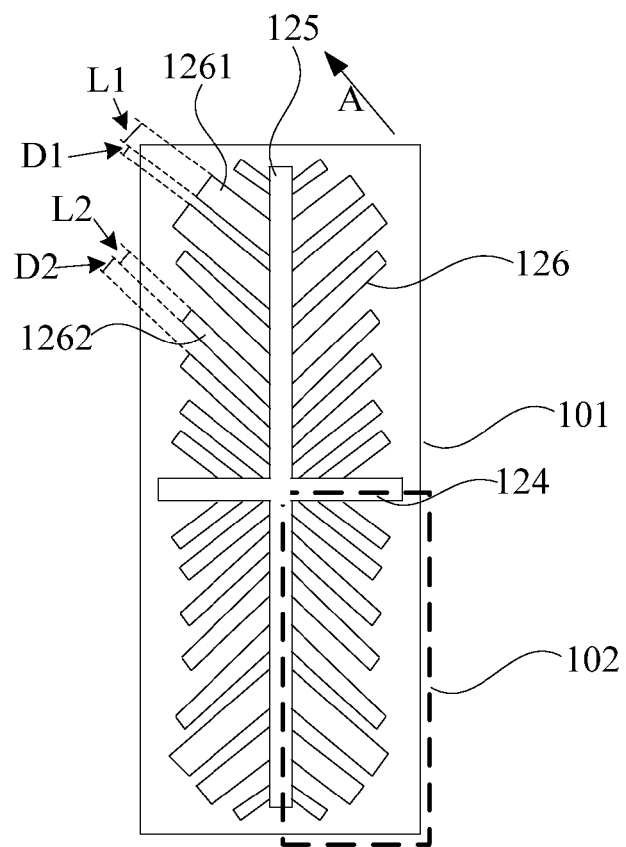
FIG. 4 is a schematic diagram showing a structure of a pixel area in FIG. 3.

Please refer to FIG. 4, FIG. 4 is a schematic diagram showing a structure of a pixel area 101 in FIG. 3. The second electrode 121 in each of the pixel areas 101 comprises a trunk. The trunk comprises a first trunk 124 and a second trunk 125. The second electrode 121 in each of the pixel areas 101 further comprises a plurality of strip branches 126. The first trunk 124 and the second trunk 125 are perpendicular to each other and form a cross. Therefore, each pixel area 101 is divided into four sub-pixel areas 102 by the first trunk 124 and the second trunk 125. In each of the sub-pixel areas 102, the strip branches 126 extend obliquely from the first trunk 124 or the second trunk 125 and the strip branches 126 are parallel with each other.

The perpendicular direction A is perpendicular to the longitudinal direction of the strip branches 126. The shortest distance between the neighboring strip branches 126 along the perpendicular direction A is called an interval, and a width of the strip branch 126 along the perpendicular direction A is called a width.

According to the first preferred embodiment shown in FIG. 3 and FIG. 4, there are at least two widths and two intervals in the pixel area 101. For example, the strip branch 126 may comprise a first strip branch 1261 and a second strip branch 1262. The first strip branch 1261 has a first width L1, and the distance between the two neighboring first strip branches 1261 is a first interval D1. The second strip branch 1262 has a second width L2, and the distance between the two neighboring second strip branches 1262 is a second interval D2.

In FIG. 4, the four sub-pixel areas 102 are symmetry around both the first trunk 124 and the second trunk 125. The two sub-pixel areas 102 above the first trunk 124 are symmetry around the second trunk 125. The two sub-pixel areas 102 at the right side of the second trunk 125 are symmetry around the first trunk 124. The above-mentioned symmetrical structure will allow the pixel area 101 to have two widths (the first width L1 and the second width L2) and two intervals (the first interval D1 and the second interval D2). In addition, the first strip branch 1261 having the first width L1 is electrically connected to the second strip branch 1262 having the second width L2.

According to the first preferred embodiment shown in FIG. 3 and FIG. 4, when a voltage is applied during a PSVA alignment process, the two different widths L1, L2 and the two different intervals D1, D2 in the pixel area 101 will cause different electric field. Therefore, two different pre-tilt angles are provided to the liquid crystal molecules. As a result, the color shift problem at large viewing angle is improved. When the liquid crystal display panel is in display mode, the different electric field strengths caused by the strip branches having different widths and intervals will provide a single sub-pixel area 102 with two different voltages and transmission curves. Therefore, the color shift problem at large viewing angle is improved.

Figure 5:
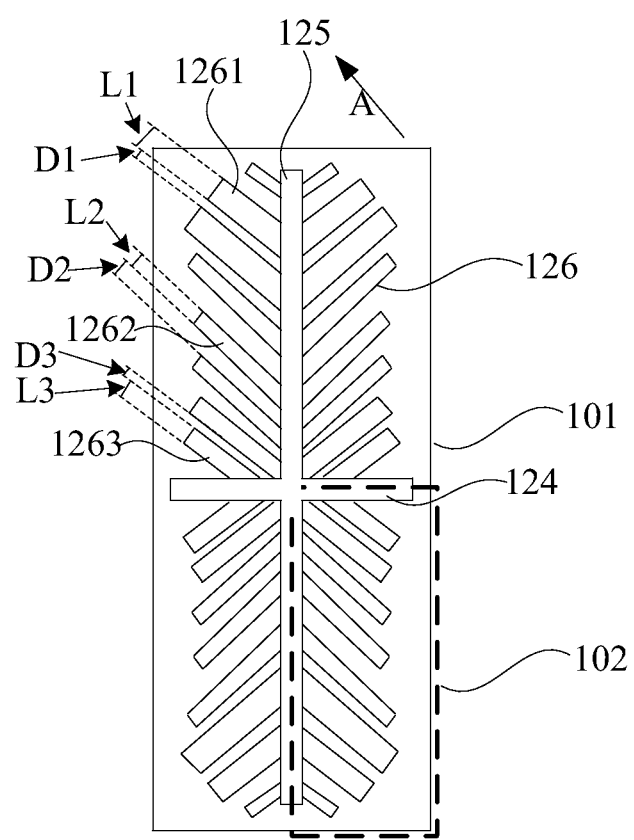
FIG. 5 is a schematic diagram showing a structure of a pixel electrode in the present invention liquid crystal display panel according to a second preferred embodiment of the present invention.

Please refer to FIG. 5, FIG. 5 is a schematic diagram showing a structure of a pixel electrode in the present invention liquid crystal display panel according to a second preferred embodiment of the present invention. According to the preferred embodiment shown in FIG. 5, apart from the first strip branch 1261 and the second strip branch 1262, the strip branch 126 further comprises a third strip branch 1263. The first strip branch 1262, the second strip branch 1262, and the third strip branch 1262 are included in one of the sub-pixel areas 102.

The first strip branch 1261 has a first width L1, and the distance between the two neighboring first strip branches 1261 is a first interval D1. The second strip branch 1262 has a second width L2, and the distance between the two neighboring second strip branches 1262 is a second interval D2. The third strip branch 1263 has a third width L3, and the distance between the two neighboring third strip branches 1263 is a third interval D3.

In FIG. 5, the four sub-pixel areas 102 are symmetry around both the first trunk 124 and the second trunk 125. The two sub-pixel areas 102 above the first trunk 124 are symmetry around the second trunk 125. The two sub-pixel areas 102 at the right side of the second trunk 125 are symmetry around the first trunk 124. The above-mentioned symmetrical structure will allow the pixel area 101 to have three widths (the first width L1, the second width L2, and the third width L3) and three intervals (the first interval D1, the second interval D2, and the third interval D3). In addition, the first strip branch 1261 having the first width L1, the second strip branch 1262 having the second width L2, and the third strip branch 1263 having the third width L3 are electrically connected.

Figure 6:
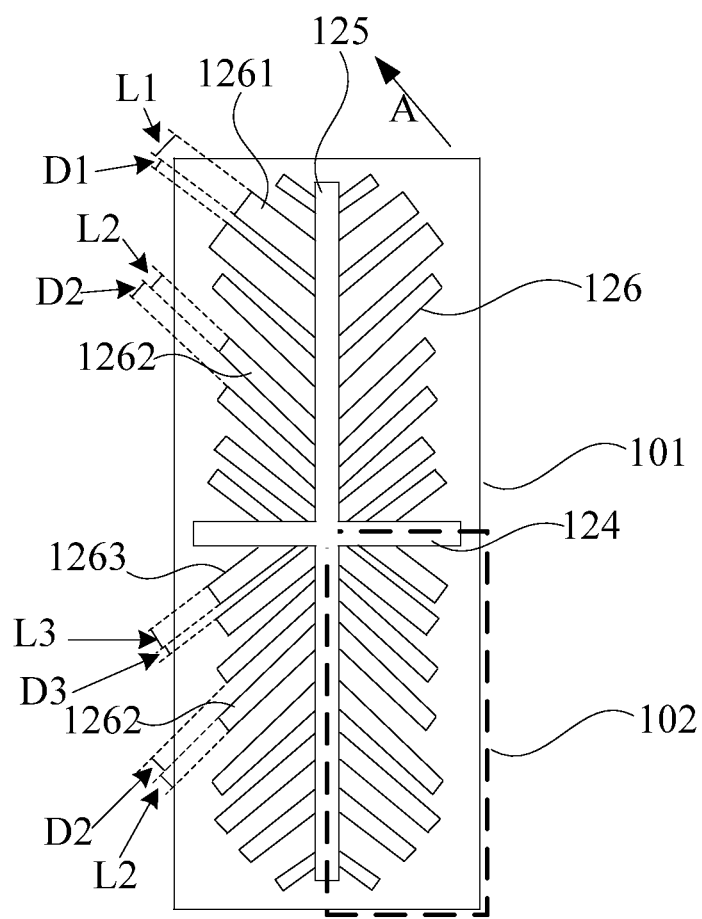
FIG. 6 is a schematic diagram showing a structure of a pixel electrode in the present invention liquid crystal display panel according to a third preferred embodiment of the present invention

Please refer to FIG. 6, FIG. 6 is a schematic diagram showing a structure of a pixel electrode in the present invention liquid crystal display panel according to a third preferred embodiment of the present invention. According to the preferred embodiment shown in FIG. 6, the first strip branch 1261, the second strip branch 1262, and the third strip branch 1263 are included in two of the sub-pixel areas 102. Specifically, the first strip branch 1261, the second strip branch 1262, and the third strip branch 1263 are disposed at a same side of the second trunk 125 (for example at the left side). In FIG. 6, the first strip branch 1261 and the second strip branch 1262 are included in one of the sub-pixel areas 102, while the second strip branch 1262 and the third strip branch 1263 are included in the other sub-pixel areas 102 at the same side of the second trunk 125.

The first strip branch 1261 has a first width L1, and the distance between the two neighboring first strip branches 1261 is a first interval D1. The second strip branch 1262 has a second width L2, and the distance between the two neighboring second strip branches 1262 is a second interval D2. The third strip branch 1263 has a third width L3, and the distance between the two neighboring third strip branches 1263 is a third interval D3.

The pixel area 101 shown in FIG. 6 has three widths (the first width L1, the second width L2, and the third width L3) and three intervals (the first interval D1, the second interval D2, and the third interval D3). In addition, the first strip branch 1261 having the first width L1, the second strip branch 1262 having the second width L2, and the third strip branch 1263 having the third width L3 are electrically connected.

According to the second and third preferred embodiments shown in FIG. 5 and FIG. 6, when a voltage is applied during a PSVA alignment process, the three different widths L1, L2, L3 and the three different intervals D1, D2, D3 in the pixel area 101 will cause different electric field strengths. Therefore, three different pre-tilt angles are provided to the liquid crystal molecules. As a result, the color shift problem at large viewing angle is improved. When the liquid crystal display panel is in display mode, the different electric field strengths caused by the strip branches having different widths and intervals will provide a single sub-pixel area 102 with three different voltages and transmission curves. Therefore, the color shift problem at large viewing angle is improved.

In FIG. 4, FIG. 5, and FIG. 6, the first, second, and third preferred embodiments only demonstrate the situations that three different widths and three different intervals are included in one or two sub-pixel areas. However, other situations in which different number of widths and intervals are provided in the same sub-pixel area 102, for example, four different widths and four different intervals included in each of the pixel area 102 is also within the scope of the present invention. Further description is not elaborated here. The present invention further provides a display apparatus comprising a backlight module and the present invention liquid crystal display panel. The liquid crystal display panel has already been described in detail and needs not be elaborated further.

In PSVA liquid crystal display panels, the distance between the strip branches is usually 2 to 3 μm, and the width of the strip branch is usually 3 to 4 μm. Even though in the present invention the width of the strip branch and the distance between the neighboring strip branches are changed at the same time, the impact on the light transmission ratio is small and almost neglectable. Oppositely, the distance between the neighboring strip branches is usually set greater than 8 μm in the MVA liquid crystal display panels and the PVA liquid crystal display panels so as to enhance the fringe field effect. Under the circumstances, any change to the width of the strip branch and the distance between the neighboring strip branches will have a strong effect on the light transmission ratio.

In contrast to the prior art, all the liquid crystal molecules within the pixel areas in the PSVA liquid crystal display panel have a pre-tilt angle and are not tilted by means of fringe field effect. In the PVA liquid crystal display panel and the MVA liquid crystal display panel, only the liquid crystal molecules influenced by the fringe field effect have a pre-tilt angle. Therefore, color shift phenomenon will be much better ameliorated by changing the width of the strip branch and the distance between the neighboring strip branches in the PSVA liquid crystal display panel than in the PVA or MVA liquid crystal display panel.

According to the present invention, the liquid crystal display panel and the display apparatus having the liquid crystal display panel have the following advantages. Because the strip branches in each of the sub-pixel areas have at least two widths and at least two intervals, different pre-tilt angles will be provided when alignment process is performed. The different pre-tilt angles will in turn solve the color shift problem at large viewing angle in display mode. In addition, the different electric field strengths caused by the strip branches having different widths and intervals in display mode will also improve the color shift problem at large viewing angle.

Although the present invention has been explained by the embodiments shown in the drawings described above, it should be understood to the ordinary skilled person in the art that the invention is not limited to the embodiments, but rather various changes or modifications thereof are possible without departing from the spirit of the invention. Accordingly, the scope of the invention shall be determined only by the appended claims and their equivalents.

What is claimed is:

1. A liquid crystal display panel, comprising:
a first substrate comprising a first electrode;
a second substrate comprising a second electrode and a plurality of pixel areas, the second electrode having a pixel electrode structure in each of the pixel areas, the pixel electrode structure comprising a trunk and a plurality of branches, the trunk comprising a first trunk and a second trunk, the first trunk and the second trunk being perpendicular to each other and dividing the pixel area into four sub-pixel areas, the branch being in strip form, a distance between the two neighboring branches being an interval, each of the branch having a width, each of the pixel areas having at least two widths and at least two intervals, the branches having different widths and different intervals being electrically connected; and a liquid crystal layer formed between the first substrate and the second substrate.

2. The liquid crystal display panel as claimed in claim 1, wherein the plurality of branches in each of the sub-pixel areas comprise a plurality of first branches and a plurality of second branches, each of the first branches has a first width, each of the second branches has a second width, a distance between the two neighboring first branches is a first interval, and a distance between the two neighboring second branches is a second interval;

wherein the four sub-pixel areas are symmetry around the first trunk and the second trunk.

3. The liquid crystal display panel as claimed in claim 2, wherein the sub-pixel area comprises a plurality of third branches, the third branch has a third width, and a distance between the two neighboring third branches is a third interval.

4. The liquid crystal display panel as claimed in claim 3, wherein the first branches, the second branches, and the third branches are in the same sub-pixel area, and the four sub-pixel areas in each of the pixel areas are symmetry around the first trunk and the second trunk.

5. The liquid crystal display panel as claimed in claim 3, wherein the first branch and the second branch are in one of the sub-pixel areas, the second branch and the third branch are in the other sub-pixel area, the two sub-pixel areas are symmetry around the first trunk;

wherein the four sub-pixel areas are symmetry around the second trunk.

6. The liquid crystal display panel as claimed in claim 2, wherein the first branch and the second branch are electrically connected to each other.

7. The liquid crystal display panel as claimed in claim 3, wherein the first branch, the second branch and the third branch are electrically connected to each other.

8. A liquid crystal display panel, comprising:

a first substrate comprising a first electrode;

a second substrate comprising a second electrode and a plurality of pixel areas, the second electrode having a pixel electrode structure in each of the pixel areas, the pixel electrode structure comprising a trunk and a plurality of branches, the branch being in strip form, a distance between the two neighboring branches being an interval, each of the branch having a width, each of the pixel areas having at least two widths and at least two intervals; and a liquid crystal layer formed between the first substrate and the second substrate.

9. The liquid crystal display panel as claimed in claim 8, wherein the trunk comprises a first trunk and a second trunk, the first trunk and the second trunk is perpendicular to each other and divide the pixel area into four sub-pixel areas;

wherein the plurality of branches in each of the sub-pixel areas comprise a plurality of first branches and a plurality of second branches, each of the first branches has a first width, each of the second branches has a second width, a distance between the two neighboring first branches is a first interval, and a distance between the two neighboring second branches is a second interval;

wherein the four sub-pixel areas are symmetry around the first trunk and the second trunk.

10. The liquid crystal display panel as claimed in claim 9, wherein the sub-pixel area comprises a plurality of third branches, the third branch has a third width, and a distance between the two neighboring third branches is a third interval.

11. The liquid crystal display panel as claimed in claim 10, wherein the first branches, the second branches, and the third branches are in the same sub-pixel area, and the four sub-pixel areas in each of the pixel areas are symmetry around the first trunk and the second trunk.

12. The liquid crystal display panel as claimed in claim 10, wherein the first branch and the second branch are in one of the sub-pixel areas, the second branch and the third branch are in the other sub-pixel area, the two sub-pixel areas are symmetry around the first trunk;

wherein the four sub-pixel areas are symmetry around the second trunk.

13. The liquid crystal display panel as claimed in claim 9, wherein the first branch and the second branch are electrically connected to each other.

14. The liquid crystal display panel as claimed in claim 10, wherein the first branch, the second branch and the third branch are electrically connected to each other.

15. A display apparatus comprising a backlight module and a liquid crystal display panel, the liquid crystal display panel comprising:

a first substrate comprising a first electrode;

a second substrate comprising a second electrode and a plurality of pixel areas, the second electrode having a pixel electrode structure in each of the pixel areas, the pixel electrode structure comprising a trunk and a plurality of branches, the branch being in strip form, a distance between the two neighboring branches being an interval, each of the branch having a width, each of the pixel areas having at least two widths and at least two intervals; and a liquid crystal layer formed between the first substrate and the second substrate.

16. The display apparatus as claimed in claim 15, wherein the trunk comprises a first trunk and a second trunk, the first trunk and the second trunk is perpendicular to each other and divide the pixel area into four sub-pixel areas;

wherein the plurality of branches in each of the sub-pixel areas comprise a plurality of first branches and a plurality of second branches, each of the first branches has a first width, each of the second branches has a second width, a distance between the two neighboring first branches is a first interval, and a distance between the two neighboring second branches is a second interval;

wherein the four sub-pixel areas are symmetry around the first trunk and the second trunk.

17. The display apparatus as claimed in claim 15, wherein the sub-pixel area comprises a plurality of third branches, the third branch has a third width, and a distance between the two neighboring third branches is a third interval.

18. The display apparatus as claimed in claim 17, wherein the first branches, the second branches, and the third branches are in the same sub-pixel area, and the four sub-pixel areas in each of the pixel areas are symmetry around the first trunk and the second trunk.

19. The display apparatus as claimed in claim 17, wherein the first branch and the second branch are in one of the sub-pixel areas, the second branch and the third branch are in the other sub-pixel area, the two sub-pixel areas are symmetry around the first trunk;

wherein the four sub-pixel areas are symmetry around the second trunk.

20. The display apparatus as claimed in claim 16, wherein the first branch and the second branch are electrically connected to each other.

* * * * *